Jan. 1, 1924
O. W. MOESLEIN
EGG SEPARATOR
Filed Dec. 5, 1922
1,479,730
2 Sheets-Sheet 2
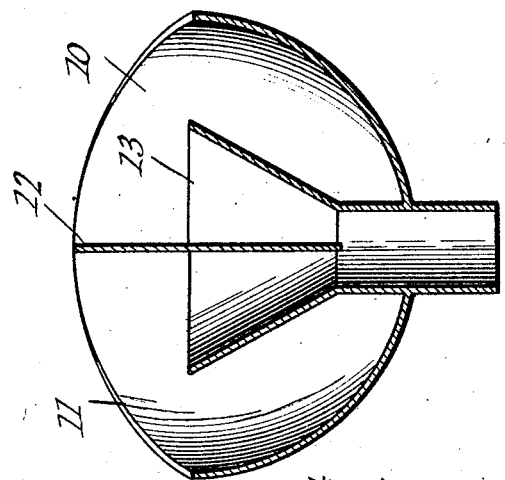
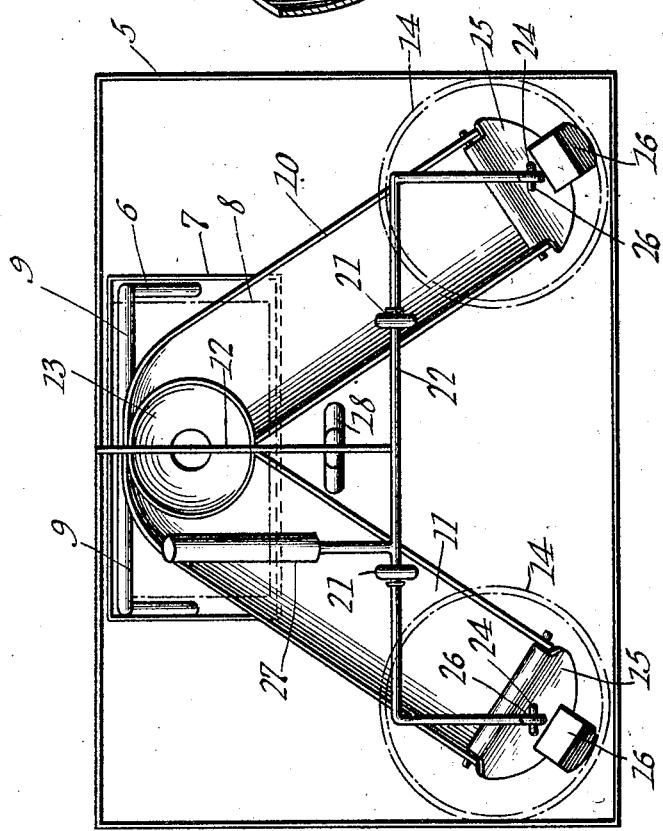
Inventor
O. W. Moeslein Patented Jan. 1, 1924.

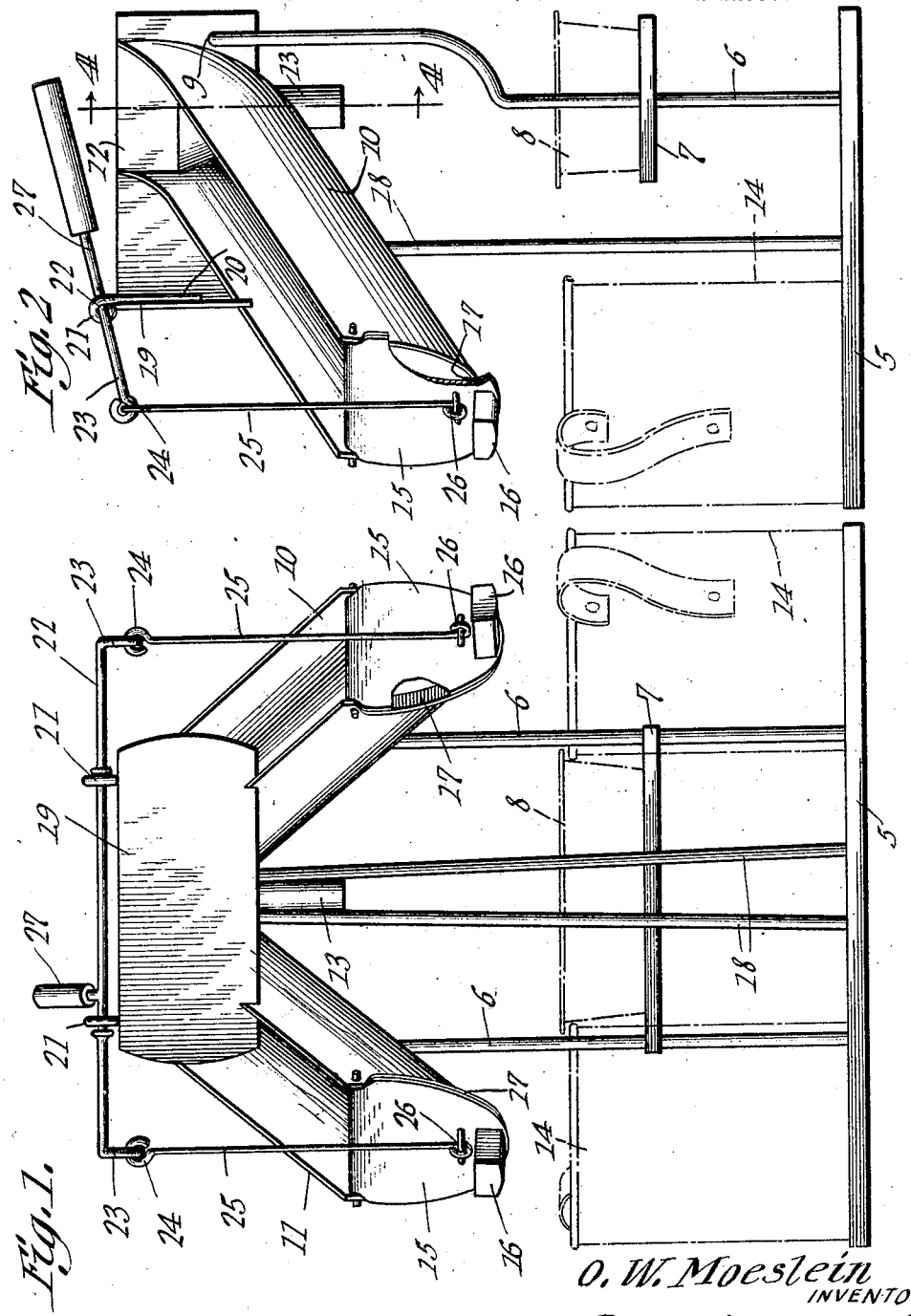

1,479,730

UNITED STATES PATENT OFFICE.

OSCAR WILLIAM MOESLEIN, OF HARRISBURG, PENNSYLVANIA.

EGG SEPARATOR.

Application filed December 5, 1922. Serial No. 605,042.

*To all whom it may concern:*

Be it known that I, OSCAR W. MOESLEIN, a citizen of the United States, residing at Harrisburg, in the county of Dauphin and State of Pennsylvania, have invented a new and useful Egg Separator, of which the following is a specification.

The present invention relates to a device designed more particularly for use by bakers to facilitate the handling and breaking of eggs in the separation of the yolks from the whites.

The primary object of the invention is to provide means to eliminate any possibility of musty or spoiled eggs being delivered to the containers in which the perfect eggs have been deposited.

Another object of the invention is to provide means for temporarily obstructing the passage of an egg to the receiving containers, to permit of examination of the egg to determine whether or not the same is fit for use.

A still further object of the invention is the provision of means controlled by the movement of the operator's hand in breaking an egg to release the previously broken egg, after an examination thereof has been made.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a front elevational view of an egg handling device constructed in accordance with the present invention.

Figure 2 is a side elevational view thereof.

Figure 3 is a plan view of the device.

Figure 4 is a sectional view taken on line 4—4 of Figure 2.

Referring to the drawing in detail, the reference character 5 designates the support or base of the device which may be in the form of a tray and constructed of any suitable material.

Extending upwardly from the base are the spaced supporting rods 6 which support the tray 7 on which the container 8 may be positioned, the upper ends of the rods 6 being connected by means of the horizontal rod 9 which in turn provides a support for the chutes 10 and 11 that have connection with the dividing plate 12.

These chutes extend from opposite sides of the plate 12 as clearly shown by Figure 3 of the drawings, there being disposed a funnel 13 under the upper ends of the chutes and supported by the plate 12. As shown, the plate 12 also divides the funnel so that when an egg is broken over the upper edge of the dividing plate 12, the drippings from the egg may pass through the funnel 13 and be directed to the container 8. The lower ends of the chutes 10 and 11 terminate in spaced relation with the support 5 to permit suitable containers indicated at 14 to be positioned thereunder.

Hinged closures 15 are pivotally supported at the discharge ends of the chutes and are held normally in their closed positions by means of the weights 16, gaskets 17 being provided on the hinged closures to present a fluid-tight connection between the closures 15 and the discharge ends of the chutes to prevent a spoiled or musty egg from passing from the chutes.

Supporting rods 18 have connection with the base 5 and have connection with the plate 12, at their upper ends, which rods 18 support the forward portion of the device.

In order that the chutes will be held in proper spaced relation with each other, plate 19 is provided that is soldered or otherwise secured to the chutes. Secured to the plate 19 are the arms 20 that have loops 21 formed at their upper ends providing bearings for the rod 22 that has right angled end portions 23 formed with loops to accommodate the hooped ends 24 of the connecting links 25. These links 25 have their lower ends connected to the closures 15 as at 26, so that movement of the rod 22 will be transmitted to the closures through the links 25 to move the closures to their open positions.

Having connection with the rods 22 and disposed in proximity to the plate 12, is an arm 27 which lies in the path of travel of a person's hand during the breaking of an egg over the dividing plate 12.

By way of explanation, it may be stated that in large bakeries where thousands of eggs are broken, which eggs are mostly cold storage eggs, it has been found that the liquor from a single musty egg will spoil a number of eggs, which have been broken, should the liquor in the musty egg be allowed to pass to the containers in which the perfect eggs are supported.

In the use of the device, it is pointed out that when the yolks are to be separated from the whites of eggs, the eggs are broken and the yolk shifted from one section of the egg shell to the other, the whites of the egg draining through between the sections of the shell held in the hands of the person separating the white from the yolk.

During this treatment of the egg, the white passes into chute 10 and passes to the lower end thereof. The yolk is now deposited in the opposite chute or cut 11 where the yolk passes to the lower end of the chute.

When the next egg is broken over the plate 12, it is obvious that should the same be a musty or egg unfit for use, the drippings caused by the breaking of the shell will pass through the funnel 13 and into the container 8, eliminating any possibility of the contents of the egg unfit for use passing into the chutes. It might be further stated that simultaneously with the breaking of the eggs, the closures 18 move to their open positions, due to the contact of the arm 27 with the person's hand in moving the egg into engagement with the plate 12, to the end that the portions of the egg held in the chutes will be deposited in their containers.

What is claimed is:—

1. In a device of the character described, a support, inclined chutes mounted on the support, said chutes being in communication with each other at their upper ends, a funnel supported at the communicating ends of the chutes, a vertically disposed plate supported adjacent to the funnel and providing an egg breaking member, closures at the free ends of the chutes, and manually controlled means for operating the closures to move the closures to their inactive positions.

2. In a device of the character described, a support, a pair of inclined chutes mounted on the support, hinged closures operating at the free ends of the chutes, a rod having right angled ends, pivotally mounted adjacent to the chutes, said right angled ends having connection with the closures, an arm extending at right angles to the rod and having connection therewith, an egg breaking member disposed adjacent to the upper ends of the chutes and aranged in proximity to the arm to lie in the path of travel of a person's hand in breaking an egg over the egg breaking member, and said arm adapted to move the rod to open the closures.

In testimony that I claim the foregoing as my own, I have hereto affixed my signature in the presence of two witnesses.

OSCAR WILLIAM MOESLEIN.

Witnesses:
    P. B. ALDINGER,
    JOHN V. SULLIVAN.